(12) United States Patent  
Nakayama

(10) Patent No.: US 8,098,982 B2
(45) Date of Patent: Jan. 17, 2012

(54) IMAGE SHAKE CORRECTION APPARATUS AND IMAGE PICKUP APPARATUS

(75) Inventor: Tatsuyuki Nakayama, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/660,159

(22) Filed: Feb. 22, 2010

(65) Prior Publication Data

US 2010/0226631 A1    Sep. 9, 2010

(30) Foreign Application Priority Data

Mar. 4, 2009  (JP) ................................. P2009-051100

(51) Int. Cl.  
*G03B 17/00*    (2006.01)
(52) U.S. Cl. ............................................ 396/55
(58) Field of Classification Search ........... 396/55  
See application file for complete search history.

(56) References Cited

U.S. PATENT DOCUMENTS

| | | | | |
|---|---|---|---|---|
| 5,153,633 | A | * | 10/1992 | Otani .............................. 396/55 |
| 5,266,988 | A | | 11/1993 | Washisu |
| 2006/0285840 | A1 | | 12/2006 | Takahashi |
| 2007/0133967 | A1 | * | 6/2007 | Takahashi et al. .............. 396/55 |
| 2007/0154195 | A1 | * | 7/2007 | Irisawa et al. ................... 396/55 |
| 2008/0055571 | A1 | | 3/2008 | Makii |
| 2010/0003023 | A1 | | 1/2010 | Takahashi |

FOREIGN PATENT DOCUMENTS

| | | |
|---|---|---|
| EP | 1795944 A1 | 6/2007 |
| EP | 1898249 A1 | 3/2008 |
| JP | 03-186823 A | 8/1991 |
| JP | 2007-017957 A | 1/2007 |
| JP | 2008-064844 A | 3/2008 |
| WO | 2008/023815 A1 | 2/2008 |

OTHER PUBLICATIONS

European Search Report, EP 10154659, dated Jul. 7, 2010.

* cited by examiner

*Primary Examiner* — Clayton E LaBalle  
*Assistant Examiner* — Dennis Hancock  
(74) *Attorney, Agent, or Firm* — Lerner, David, Littenberg, Krumholz & Mentlik, LLP

(57) ABSTRACT

An image shake correction apparatus includes: a fixed member; a first guide shaft; a second guide shaft; an intermediate member; and a movable member.

8 Claims, 13 Drawing Sheets

IMAGE SHAKE CORRECTION APPARATUS AND IMAGE PICKUP APPARATUS

CROSS-REFERENCE TO RELATED APPLICATION

The present application claims priority from Japanese Patent Application No. JP 2009-051100 filed in the Japanese Patent Office on Mar. 4, 2009, the entire content of which is incorporated herein by reference.

BACKGROUND OF THE INVENTION

1. Field of the Invention

This invention relates to a technical field of an image shake correction apparatus and an image pickup apparatus. More specifically, the present invention relates to a technical field for achieving, in an image shake correction apparatus and an image pickup apparatus which include a first guide shaft and a second guide shaft extending perpendicularly to each other, prevention of unnecessary rotational movement of the movable member in a plane perpendicular to the direction of an optical axis upon image shake correction and assurance of a smooth moving operation of the movable member.

2. Description of the Related Art

Some image pickup apparatus of video cameras, still cameras and so forth include an image shake correction apparatus which moves a lens or an image pickup device in a direction perpendicular to the direction of the optical axis of the lens or the image pickup device to carry out image shake correction.

One of such image shake correction apparatus is disclosed in Japanese Patent Laid-Open No. 2008-64844 (hereinafter referred to as Patent Document 1) which includes a base member or fixed member and a holding member or movable member having a lens or an image pickup device held thereon and movable in two directions perpendicular to the direction of the optical axis of the lens or the image pickup device with respect to the base member.

In the image shake correction apparatus disclosed in Patent Document 1, a guide shaft is attached to the fixed member and extends in a first direction perpendicular to the direction of the optical axis. A pair of supporting pieces are provided on the holding member and have elongated holes elongated in a second direction perpendicular to both of the direction of the optical axis and the first direction. The supporting pieces are supported for sliding movement on the guide shaft. An annular rolling preventing member is supported on the guide shaft and engages for sliding movement with a sliding groove which is formed on the holding member and extends in the second direction.

In the image shake correction apparatus, the holding member is moved in the first direction integrally with the rolling preventing member with respect to the base member under the guidance of the guide shaft. Further, the rolling preventing member is slidably moved along the sliding groove to move the holding member in the second direction with respect to the base member.

Since the rolling preventing member remains in a state wherein it is always inserted in the sliding groove, rotation of the holding member in a plane perpendicular to the direction of the optical axis is prevented upon movement of the holding member in the first direction and the second direction.

SUMMARY OF THE INVENTION

However, in the image shake correction apparatus disclosed in Patent Document 1, since the rolling preventing member is always kept inserted in the sliding groove, when force acting in a rotating direction in a plane perpendicular to the direction of the optical axis is applied to the holding member, the rolling preventing member is pressed against a side edge of the sliding groove.

As a result, a high load is applied to the moving operation of the holding member and obstructs smooth moving operation of the holding member. Further, depending upon the magnitude of the load, the holding member may fail to move with respect to the base member.

Therefore, it is desirable to provide an image shake correction apparatus and an image pickup apparatus which can achieve prevention of unnecessary rotational movement of a movable member in a plane perpendicular to the direction of an optical axis upon image shake correction and assurance of smooth moving operation of the movable member.

According to an embodiment of the present invention, there is provided an image shake correction apparatus including a fixed member fixed in three directions including a direction of an optical axis, a first direction perpendicular to the direction of the optical axis, and a second direction perpendicular to both of the direction of the optical axis and the first direction, a first guide shaft supported on the fixed member and extending in the first direction, a second guide shaft supported on the fixed member and extending in the second direction, an intermediate member supported on the first guide shaft and the second guide shaft for movement in one of the first and second directions but against movement in the other of the first and, second directions with respect to the fixed member, and a movable member having a lens or an image pickup device held thereon and supported on the first and second guide shafts for movement in the first and second directions with respect to the fixed member and for movement in the other of the first and second directions but against movement in the one of the first and second directions with respect to the intermediate member, the intermediate member and the movable member being moved integrally with each other in the one of the first and second directions with respect to the fixed member while the movable member is moved in the other of the first and second directions with respect to the fixed member to correct image shake.

Accordingly, in the image shake correction apparatus, the movable member is moved in the first direction and the second direction with respect to the fixed member in a state wherein the movable member is supported on the first guide member and the second guide member.

With the image shake correction apparatus, rotation of the movable member in a plane perpendicular to the direction of the optical axis upon movement of the movable member in the first direction and the second direction is prevented, and smooth movement of the movable member in the first direction and the second direction can be assured.

Preferably, the image shake correction apparatus is configured such that the fixed member has an outer peripheral portion formed in the form of a framework, and the intermediate member is positioned on the inner periphery side of the outer peripheral portion of the fixed member.

In the image shake correction apparatus, since the intermediate member is positioned on the inner periphery side of the outer peripheral portion of the fixed member, the intermediate member and the fixed member are disposed in the same plane perpendicular to the direction of the optical axis.

Consequently, with the image shake correction apparatus, reduction in thickness of the image shake correction apparatus in the direction of the optical axis can be anticipated.

In this instance, preferably the image shake correction apparatus is configured such that the intermediate member is formed in the form of a framework, and the movable member is positioned on the inner periphery side of the intermediate member.

In the image shake correction apparatus, since the movable member is positioned on the inner periphery side of the intermediate member, the movable member and the intermediate member are disposed in the same plane perpendicular to the direction of the optical axis.

Accordingly, with the image shake correction apparatus, further reduction in thickness of the image shake correction apparatus in the direction of the optical axis can be anticipated.

Preferably, the image shake correction apparatus is configured such that the fixed member has a receiving portion, and the intermediate member has a position restraining projection provided thereon and projecting in the direction of the optical axis so as to be capable of contacting with the projection in the direction of the optical axis.

In the image shake correction apparatus, since the intermediate member has the position restraining projection provided thereon and projecting in the direction of the optical axis so as to be capable of contacting with the receiving portion in the direction of the optical axis, the movement of the intermediate member in the direction of the optical axis is restrained.

Accordingly, with the image shake correction apparatus, play of the intermediate member in the direction of the optical axis with respect to the fixed member can be prevented without relying upon the first guide shaft and the second guide shaft.

Preferably, the image shake correction apparatus is configured such that the intermediate member has a position restraining projection provided thereon and projecting in the direction of the optical axis so as to be capable of contacting with a holding tube, which holds the fixed member thereon, in the direction of the optical axis.

In the image shake correction apparatus, since the intermediate member has the position restraining projection provided thereon and projecting in the direction of the optical axis so as to be capable of contacting with the holding tube in the direction of the optical axis, the movement of the intermediate member in the direction of the optical axis is restrained.

Accordingly, with the image shake correction apparatus, play of the intermediate member in the direction of the optical axis with respect to the fixed member can be prevented without relying upon the first guide shaft and the second guide shaft.

Preferably, the image shake correction apparatus is configured such that the other of the first and second directions is the direction of the gravity.

In the image shake correction apparatus, since the other of the first and second directions is the direction of the gravity, the direction of the movement of the movable member with respect to the fixed member coincides with the direction of the gravity.

Accordingly, with the image shake correction apparatus, the holding force corresponding to the gravity is required only for the movable member which does not include the intermediate member. Consequently, the power consumption can be reduced and improvement of the performance for shake correction can be anticipated as much.

According to another embodiment of the present invention, there is provided an image pickup apparatus including an image shake correction apparatus for moving an lens or an image pickup device in a direction perpendicular to a direction of an optical axis to correct image shake, the image shake correction apparatus including a fixed member fixed in three directions including a direction of an optical axis, a first direction perpendicular to the direction of the optical axis, and a second direction perpendicular to both of the direction of the optical axis and the first direction, a first guide shaft supported on the fixed member and extending in the first direction, a second guide shaft supported on the fixed member and extending in the second direction, an intermediate member supported on the first guide shaft and the second guide shaft for movement in one of the first and second directions but against movement in the other of the first and second directions with respect to the fixed member, and a movable member having a lens or an image pickup device held thereon and supported on the first and second guide shafts for movement in the first and second directions with respect to the fixed member and for movement in the other of the first and second directions but against movement in the one of the first and second directions with respect to the intermediate member, the intermediate member and the movable member being moved integrally with each other in the one of the first and second directions with respect to the fixed member while the movable member is moved in the other of the first and second directions with respect to the fixed member to correct image shake.

Accordingly, in the image pickup apparatus, the movable member is moved in the first direction and the second direction with respect to the fixed member in a state wherein the movable member is supported on the first guide member and the second guide member.

Accordingly, with the image pickup apparatus, rotation of the movable member in a plane perpendicular to the direction of the optical axis upon movement of the movable member in the first direction and the second direction is prevented, and smooth movement of the movable member in the first direction and the second direction can be assured.

Preferably, the image pickup apparatus is configured such that the other of the first and second directions is the direction of the gravity.

In the image pickup apparatus, since the other of the first and second directions is the direction of the gravity, the direction of the movement of the movable member with respect to the fixed member coincides with the direction of the gravity.

Accordingly, with the image pickup apparatus, the holding force corresponding to the gravity is required only for the movable member which does not include the intermediate member. Consequently, the power consumption can be reduced and improvement of the performance for shake correction can be anticipated as much.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, preferred embodiments of the present invention are described in detail with reference to the accompanying drawings.

In the embodiments described below, the image pickup apparatus of the present invention is applied to a video camera, and the image shake correction apparatus of the present invention is applied to an image shake correction apparatus provided in the video camera.

It is to be noted that the application range of the image pickup apparatus and the image shake correction apparatus of the present invention is not limited to the video camera and the image shake correction apparatus provided in the video camera, respectively. The image pickup apparatus and the image shake correction apparatus of the present invention can be applied widely to image pickup apparatus incorporated in various apparatus such as, for example, a still camera, a portable telephone set and a PDA (Personal Digital Assistant) or image shake correction apparatus provided in such image pickup apparatus.

It is to be noted that forward, backward, upward, downward, leftward and rightward directions in the following description are those as viewed from an image pickup person upon image pickup of the video camera. Accordingly, the image pickup object side corresponds to the forward direction, and the image pickup person side corresponds to the backward direction.

It is to be noted that the forward, backward, upward, downward, leftward and rightward directions described below are naturally used for the convenience of description, and in embodying the present invention, actual directions are not limited to the specific directions.

Further, the term "lens" used hereinbelow is used to represent a concept which includes both of a lens system which is composed of a single lens and another lens system which is composed of a plurality of lenses as a lens group.

First, the image shake correction apparatus is described.

First Embodiment

In the following, the image pickup correction apparatus according to a first embodiment of the present invention is described with reference to FIGS. 1 to 9.

Figure 1:
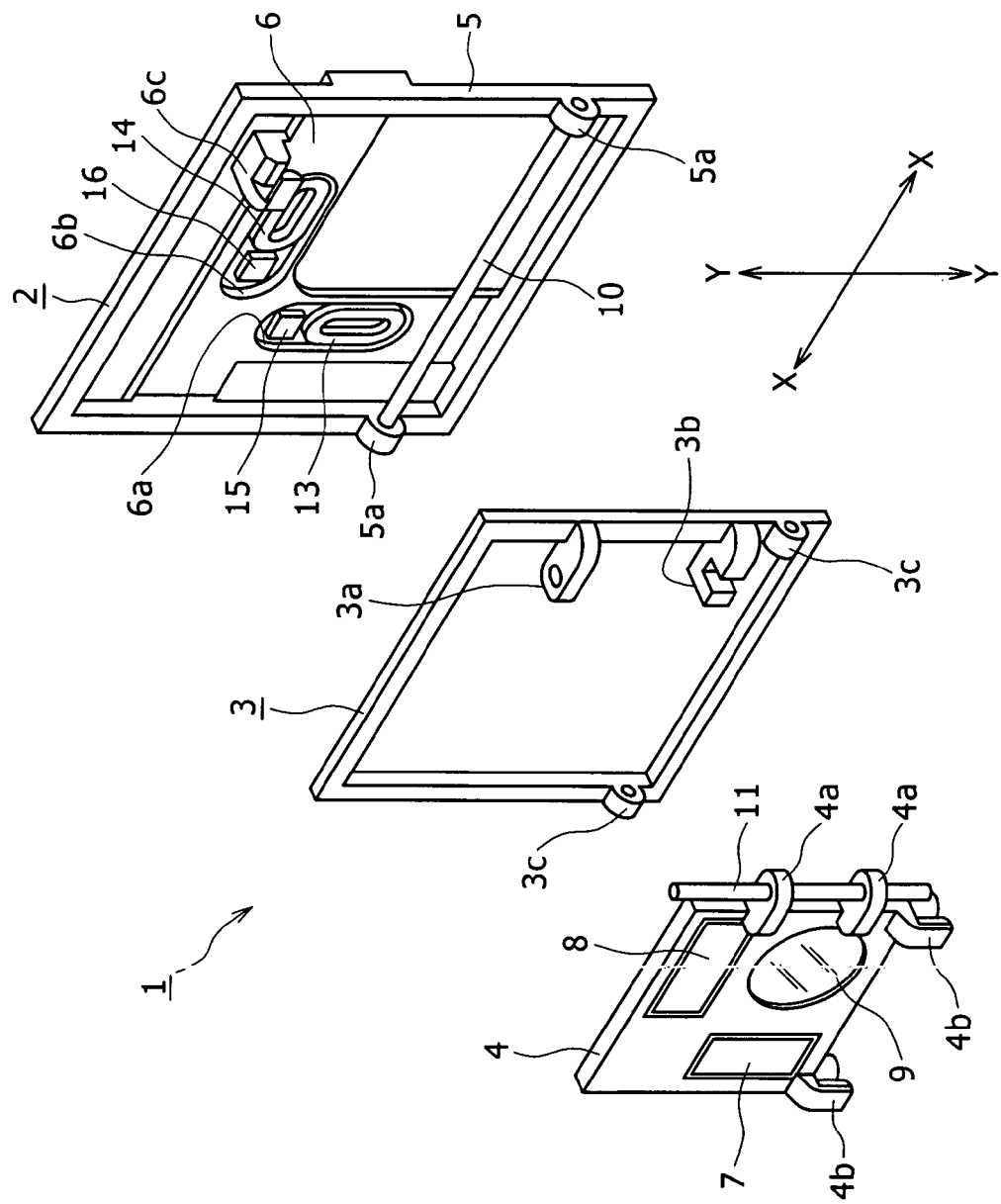
FIG. 1 is an exploded perspective view showing an image shake correction apparatus according to a first embodiment of the present invention.
Figure 2:
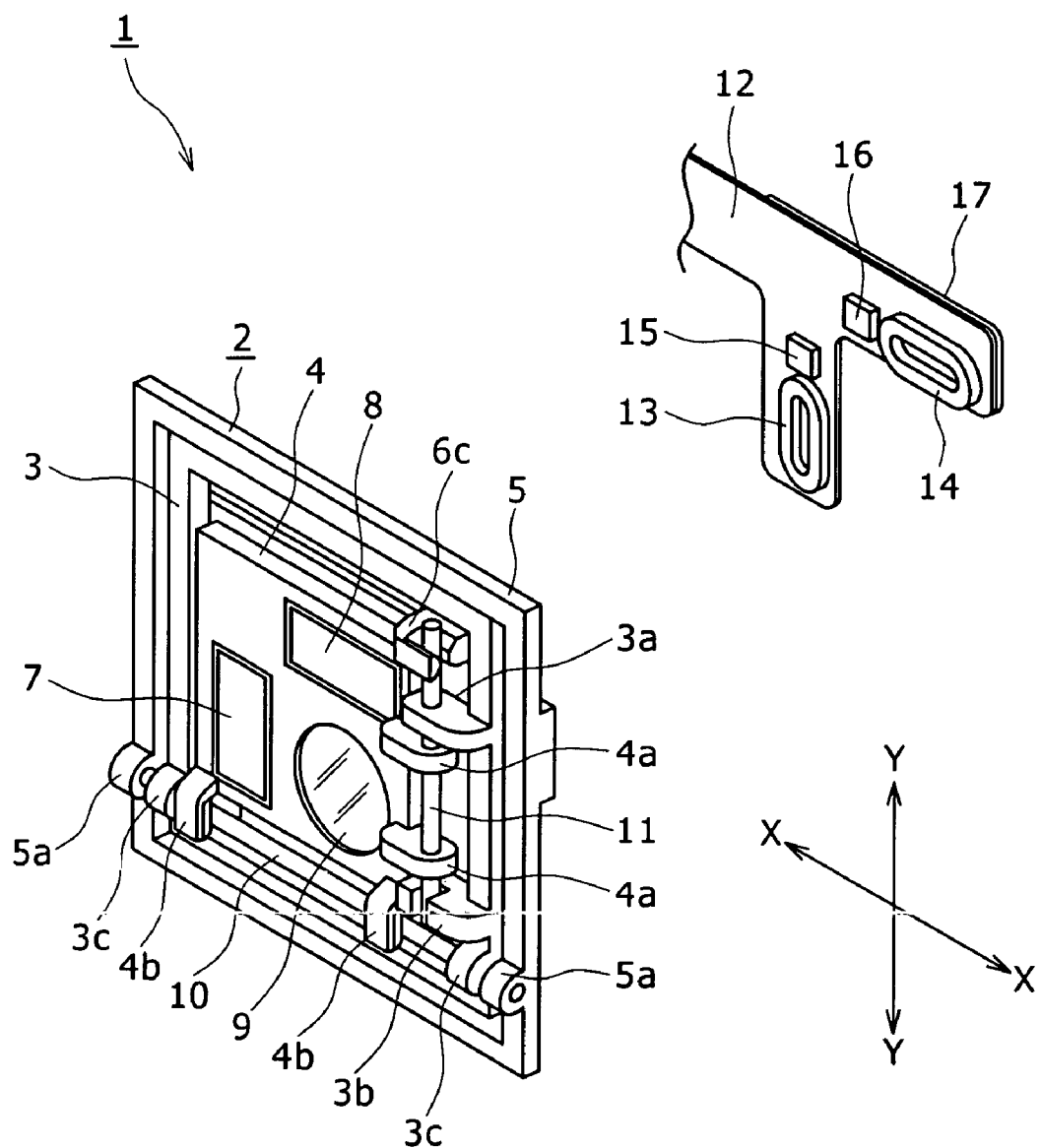
FIG. 2 is a perspective view showing the image shake correction apparatus with a flexible printed wiring board removed.
Figure 3:
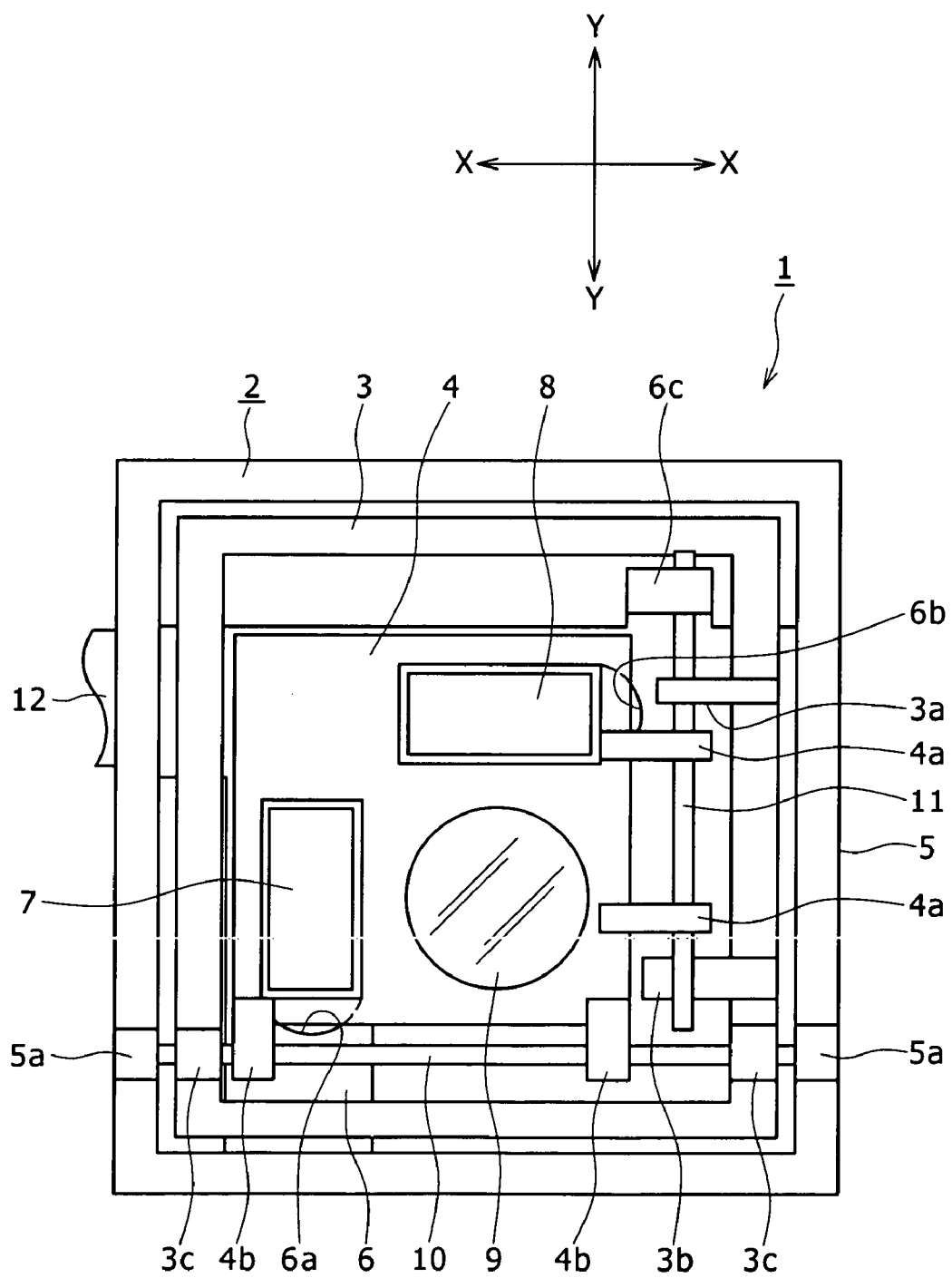
FIG. 3 is an enlarged front elevational view of the image shake correction apparatus.

Referring first to FIGS. 1 to 3, the image shake correction apparatus 1 includes a fixed member 2, an intermediate member 3 and a movable member 4.

The fixed member 2 includes a framework-like portion 5 formed like a rectangular framework and an attaching face portion 6 provided on the inner side of the framework-like portion 5. The fixed member 2 is secured, for example, to a holding tube not shown provided as an external housing for a lens barrel.

A pair of round bearing sections 5a are provided in a leftwardly and rightwardly spaced relationship from each other at positions of the framework-like portion 5 of the fixed member 2 rather near to a lower end and project forwardly. A circular bearing hole is formed leftwardly and rightwardly through each of the round bearing sections 5a.

The attaching face portion 6 of the fixed member 2 is provided such that it connects the rear face of the framework-like portion 5, and a vertically elongated first disposition hole 6a and a horizontally elongated second disposition hole 6b are formed on the attaching face portion 6. A channel-shaped bearing portion 6c is provided at a position of an upper end portion of the attaching face portion 6 rather near to a left end such that it projects forwardly and is open leftwardly.

The intermediate member 3 is formed as a rectangular framework one size smaller than the framework-like portion 5 of the fixed member 2.

A bearing portion 3a is provided at a position of a left end portion of the intermediate member 3 rather near to an upper end such that it projects forwardly. A bearing hole elongated in the forward and backward direction is formed upwardly and downwardly through the bearing portion 3a. A channel-shaped bearing section 3b is provided at a position of a left end portion of the intermediate member 3 rather near to a lower end and projects forwardly such that it is open forwardly. A pair of round bearing sections 3c are provided in a leftwardly and rightwardly spaced relationship from each other at positions of the intermediate member 3 rather near to a lower end and project forwardly. A circular bearing hole is formed leftwardly and rightwardly through each of the round bearing sections 3c.

The movable member 4 is formed as a rectangular plate and has an outer shape smaller than the inner shape of the intermediate member 3.

A vertically elongated first driving magnet 7 and a horizontally elongated second driving magnet 8 are attached in an embedded state to the movable member 4. A lens 9 is held on the movable member 4 and functions as a lens for correction. It is to be noted that the lens 9 may be replaced by an image pickup device such as a CCD (Charge Coupled Device) device or a CMOS (Complementary Metal Oxide Semiconductor) device.

A pair of round bearing sections 4a are provided in an upwardly and downwardly spaced relationship from each other at a left end portion of the movable member 4 such that they project leftwardly. A pair of channel-shaped bearing portions 4b are provided in a leftwardly and rightwardly spaced relationship from each other at a lower end portion of the movable member 4 such that they project downwardly and are open downwardly.

A first guide shaft 10 is fixedly attached to the fixed member 2 such that it extends in the leftward and rightward direction, that is, in the first direction which is an X-X direction shown in FIGS. 1 to 3, between the round bearing sections 5*a*. The fixed member 2 is supported at the channel-shaped bearing section 6*c* thereof for sliding movement at an upper end portion of a second guide shaft 11 which extends in an upward and downward direction, that is, in the second direction which is a Y-Y direction in FIGS. 1 to 3.

A flexible printed wiring board 12 is attached to a rear face of the attaching face portion 6 of the fixed member 2, and a vertically elongated first driving coil 13 and a horizontally elongated second driving coil 14 are attached to the front face of the flexible printed wiring board 12. A first detection element 15 and a second detection element 16 are attached to positions of the front face of the flexible printed wiring board 12 which are adjacent the first driving coil 13 and the second driving coil 14, respectively. For example, a Hall device is used for the first detection element 15 and the second detection element 16. A reinforcing plate 17 is attached to the rear face of the flexible printed wiring board 12.

In a state wherein the flexible printed wiring board 12 is attached to the rear face of the attaching face portion 6, the first driving coil 13 and the first detection element 15 are inserted and disposed in the first disposition hole 6*a* and the second driving coil 14 and the second detection element 16 are inserted and disposed in the second disposition hole 6*b*.

The intermediate member 3 is disposed on the inner periphery side of the framework-like portion 5 of the fixed member 2 with the round bearing sections 3*c* thereof supported for sliding movement on the first guide shaft 10 and with the bearing section 3*a* and the channel-shaped bearing section 3*b* thereof supported for sliding movement on the second guide shaft 11. Accordingly, the intermediate member 3 is movable in the first direction, that is, in the leftward and rightward direction, through the first guide shaft 10 on the inner periphery side of the framework-like portion 5 with respect to the fixed member 2.

The movable member 4 is supported at the channel-shaped bearing portions 4*b* thereof for sliding movement on the first guide shaft 10. The second guide shaft 11 is fixedly attached to the round bearing sections 4*a* of the movable member 4. The second guide shaft 11 projects at the opposite upper and lower end portions thereof upwardly and downwardly from the round bearing sections 4*a*, respectively. The movable member 4 is disposed on the inner periphery side of the intermediate member 3.

In a state wherein the movable member 4 is disposed on the inner periphery side of the intermediate member 3, the first driving magnet 7 is positioned in an opposing relationship to and forwardly of the first driving coil 13 and the first detection element 15, and the second driving magnet 8 is positioned in an opposing relationship to and forwardly of the second driving coil 14 and the second detection element 16.

Since the movable member 4 is supported at the second guide shaft 11 thereof on the bearing section 3*a* and the channel-shaped bearing section 3*b*, movement thereof in the first direction with respect to the intermediate member 3 is restrained. However, upon movement of the intermediate member 3 in the first direction with respect to the fixed member 2, the movable member 4 is moved integrally with the intermediate member 3 in the first direction.

Since the second guide shaft 11 secured to the round bearing sections 4*a* of the movable member 4 are slidably moved along the channel-shaped bearing section 6*c* of the fixed member 2 and the bearing section 3*a* and the channel-shaped bearing section 3*b* of the intermediate member 3, the movable member 4 can move in the upward and downward direction, that is, in the second direction with respect to the fixed member 2 and the intermediate member 3.

In the image shake correction apparatus 1 having such a configuration as described above, if current is supplied to the first driving coil 13, then leftward or rightward thrust is applied to the movable member 4 in response to the direction of the supplied current in a relation to the first driving magnet 7. Consequently, the intermediate member 3 and the movable member 4 are moved integrally with each other in the first direction with respect to the fixed member 2. On the other hand, if current is supplied to the second driving coil 14, then upward or downward thrust is applied to the movable member 4 in response to the direction of the supplied current in a relation to the second driving magnet 8. Consequently, the movable member 4 is moved in the second direction with respect to the intermediate member 3 and the fixed member 2.

As the movable member 4 which holds the lens 9 or the image pickup apparatus is moved in the first direction and the second direction as described above, image shake is corrected. At this time, the position of the movable member 4 with respect to the fixed member 2 is detected at any time by the first detection element 15 and the second detection element 16, and appropriate operation of the movable member 4 is achieved.

It is to be noted that, while, in the example described above, the channel-shaped bearing section 6*c* is provided on the fixed member 2, the channel-shaped bearing section 3*b* is provided on the intermediate member 3 and the second channel-shaped bearing sections 4*b* are provided on the movable member 4, it is possible to replace each of the channel-shaped bearing sections 6*c*, 3*b* and 4*b* with a bearing section having a leftwardly and rightwardly, forwardly and backwardly or upwardly and downwardly elongated hole.

Further, while, in the example described above, the bearing section 3*a* having the bearing hole elongated forwardly and backwardly is provided on the intermediate member 3, also it is possible to replace the bearing section 3*a* with a channel-shaped bearing section which is open forwardly or rearwardly.

It is to be noted that the bearing section 3*a* is shaped so as to have not a circular bearing hole but a bearing hole elongated forwardly and backwardly. Where the bearing section 3*a* has the bearing hole elongated forwardly and backwardly in this manner, a good sliding property of the second guide shaft 11 with respect to the channel-shaped bearing sections 6*c* and 3*b* can be assured, and a smooth moving operation of the movable member 4 in the second direction can be assured.

As described above, in the image shake correction apparatus 1, the intermediate member 3 and the movable member 4 are moved in the first direction with respect to the fixed member 2 and the movable member 4 is moved in the second direction with respect to the fixed member 2 to correct image shake. Therefore, the structure is simple, and simplification in mechanism and reduction in production cost can be anticipated.

Further, in the image shake correction apparatus 1, since the intermediate member 3 and the movable member 4 are supported on the first guide shaft 10 and the second guide shaft 11 both supported on the fixed member 2, the accuracy in position of the movable member 4 in the direction of the optical axis and the accuracy in gradient of the movable member 4 with respect to the optical axis depend upon the accuracy in position of the first guide shaft 10 and the second guide shaft 11 but do not rely upon the accuracy in position and the accuracy in gradient of the intermediate member 3 with respect to the fixed member 2. Accordingly, since the accuracy in position of the lens 9 or the image pickup apparatus held on the movable member 4 does not rely upon the accuracy in position and the accuracy in gradient of the intermediate member 3, improvement in accuracy of the operation position in shake correction can be anticipated.

Figure 4:
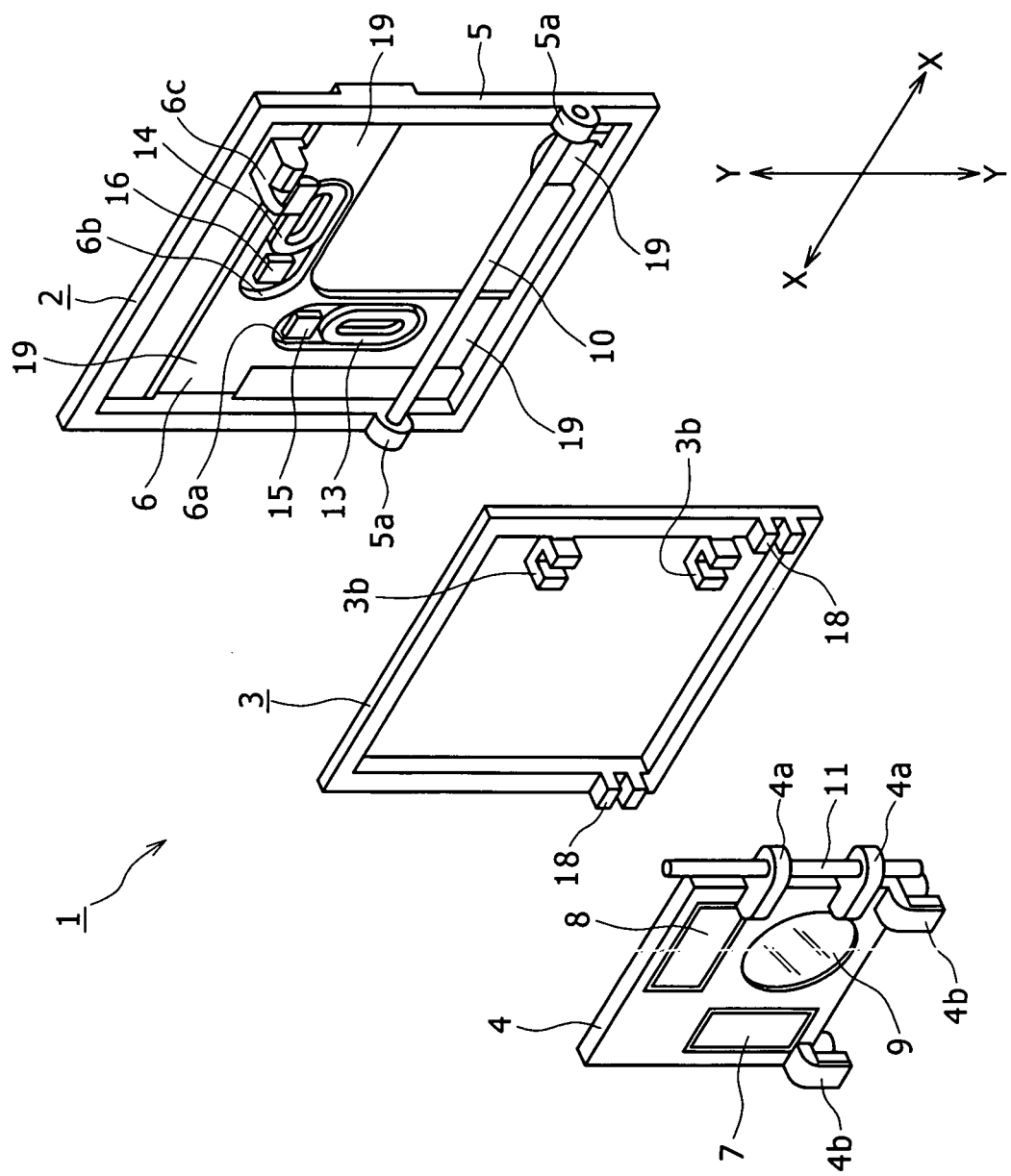
FIG. 4 is an exploded perspective view showing the image shake correction apparatus which uses a bearing section having a changed shape.
Figure 5:
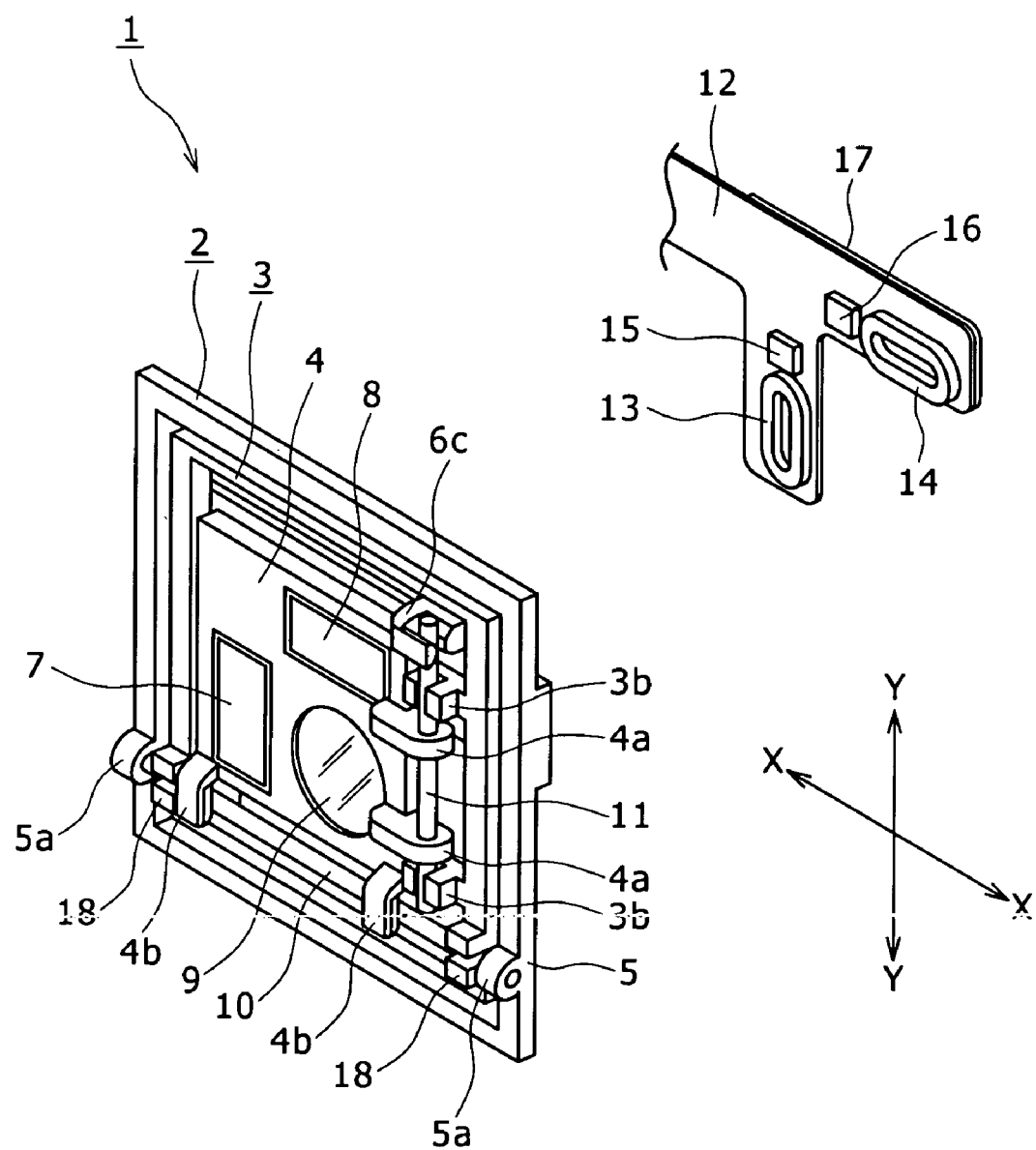
FIG. 5 is a perspective view showing the image shake correction apparatus shown in FIG. 4 with the flexible printed wiring board removed.

While, in the example described above, the round bearing sections 3c are provided at positions of the intermediate member 3 rather near to the lower end and are supported on the first guide shaft 10, the round bearing sections 3c may be replaced by channel-shaped bearing sections 18 which are open forwardly as shown in FIGS. 4 and 5.

Or, the bearing section 3a of the intermediate member 3 may be provided in place of the channel-shaped bearing section 3b.

Figure 6:
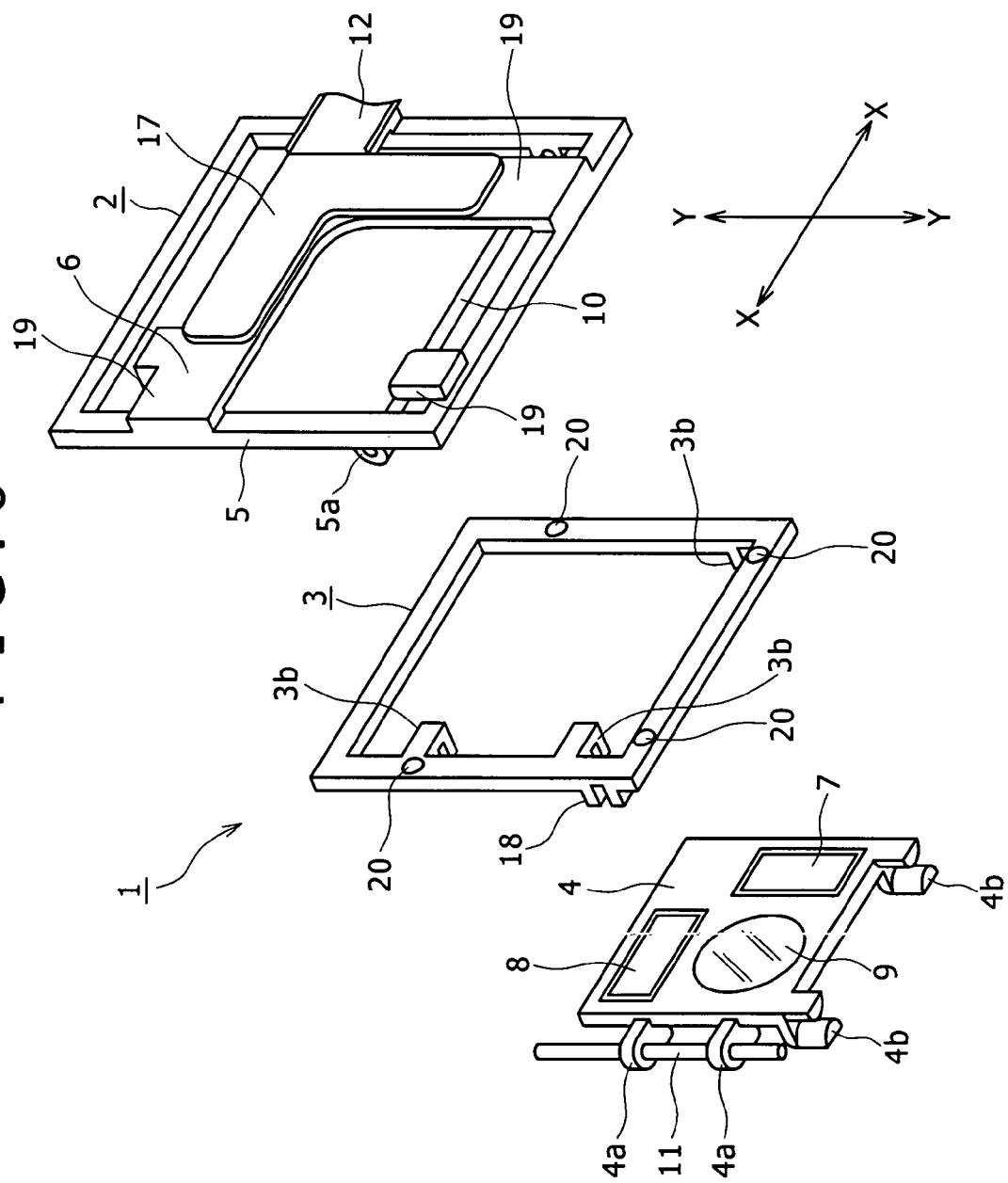
FIG. 6 is an exploded perspective view showing the image shake correction apparatus of FIG. 4 as viewed from the opposite side to that of FIG. 4.

In this instance, preferably a plurality of receiving portions 19 are provided in a leftwardly and rightwardly spaced relationship at the opposite upper and lower end portions of the fixed member 2 as shown in FIGS. 4 and 6. Further, preferably a plurality of position restraining projections 20 are provided at positions of the opposite upper and lower end portions of the intermediate member 3 opposing to the receiving portions 19 such that they project rearwardly for individually contacting with the receiving portions 19 in a state wherein the bearing sections of the intermediate member 3 are supported on the first guide shaft 10. The position restraining projections 20 have an outer face formed in a moderate curved face. It is to be noted that several portions of the attaching face portion 6 are used as the receiving portions 19 except some of them.

Where the receiving portions 19 are provided on the fixed member 2 and the position restraining projections 20 are provided on the intermediate member 3 in this manner, play of the intermediate member 3 in the direction of the optical axis with respect to the fixed member 2 can be prevented without relying upon the first guide shaft 10 and the second guide shaft 11. In particular, even if the bearing sections 18 and the channel-shaped bearing sections 3b are provided to form a configuration wherein the intermediate member 3 is movable rearwardly with respect to the fixed member 2, the position restraining projections 20 are contacted with the receiving portions 19, and consequently, play of the intermediate member 3 in the direction of the optical axis with respect to the fixed member 2 can be prevented without relying upon the first guide shaft 10 and the second guide shaft 11.

Figure 7:
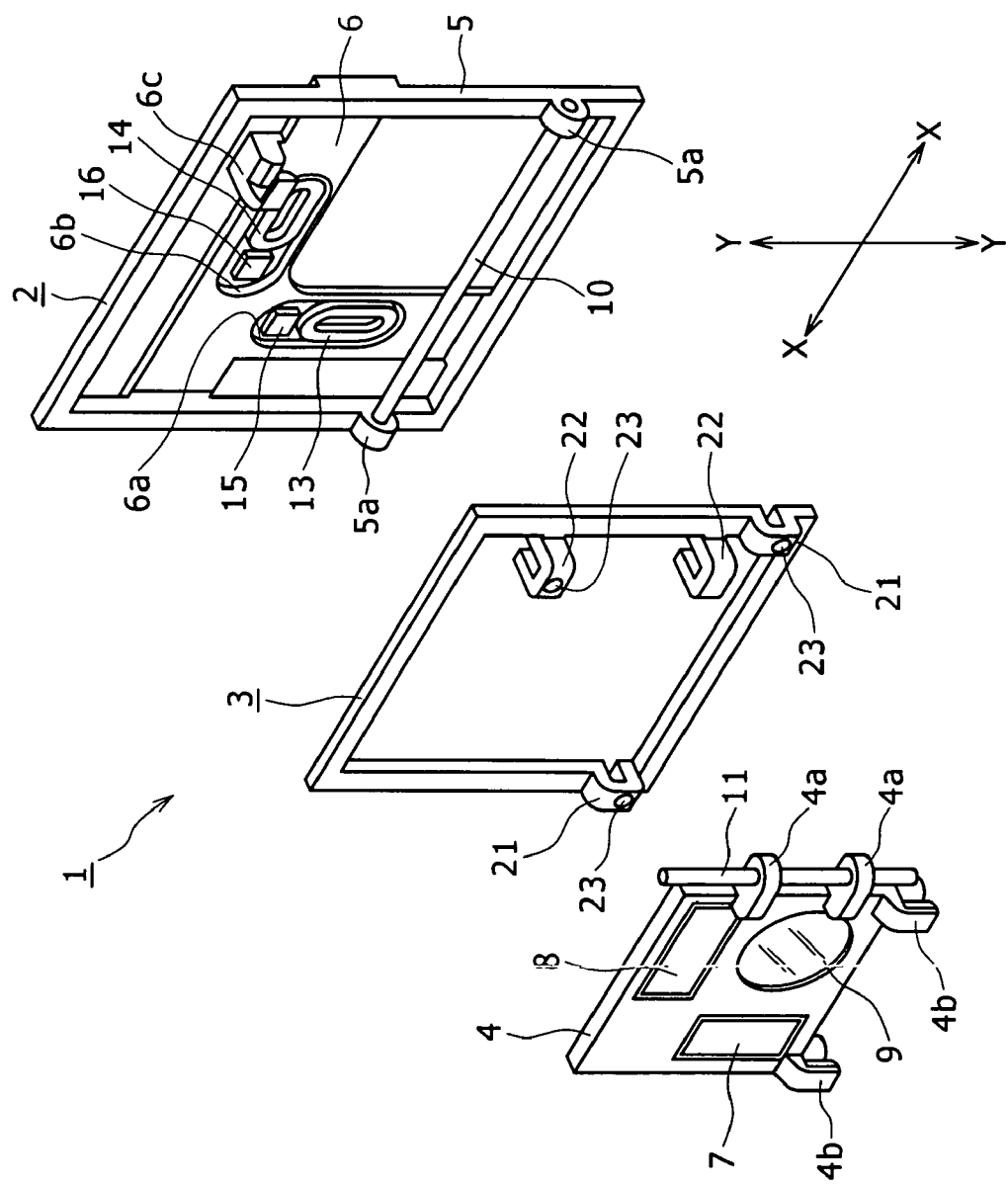
FIG. 7 is an exploded perspective view showing the image shake correction apparatus which uses a bearing section having another changed shape.
Figure 8:
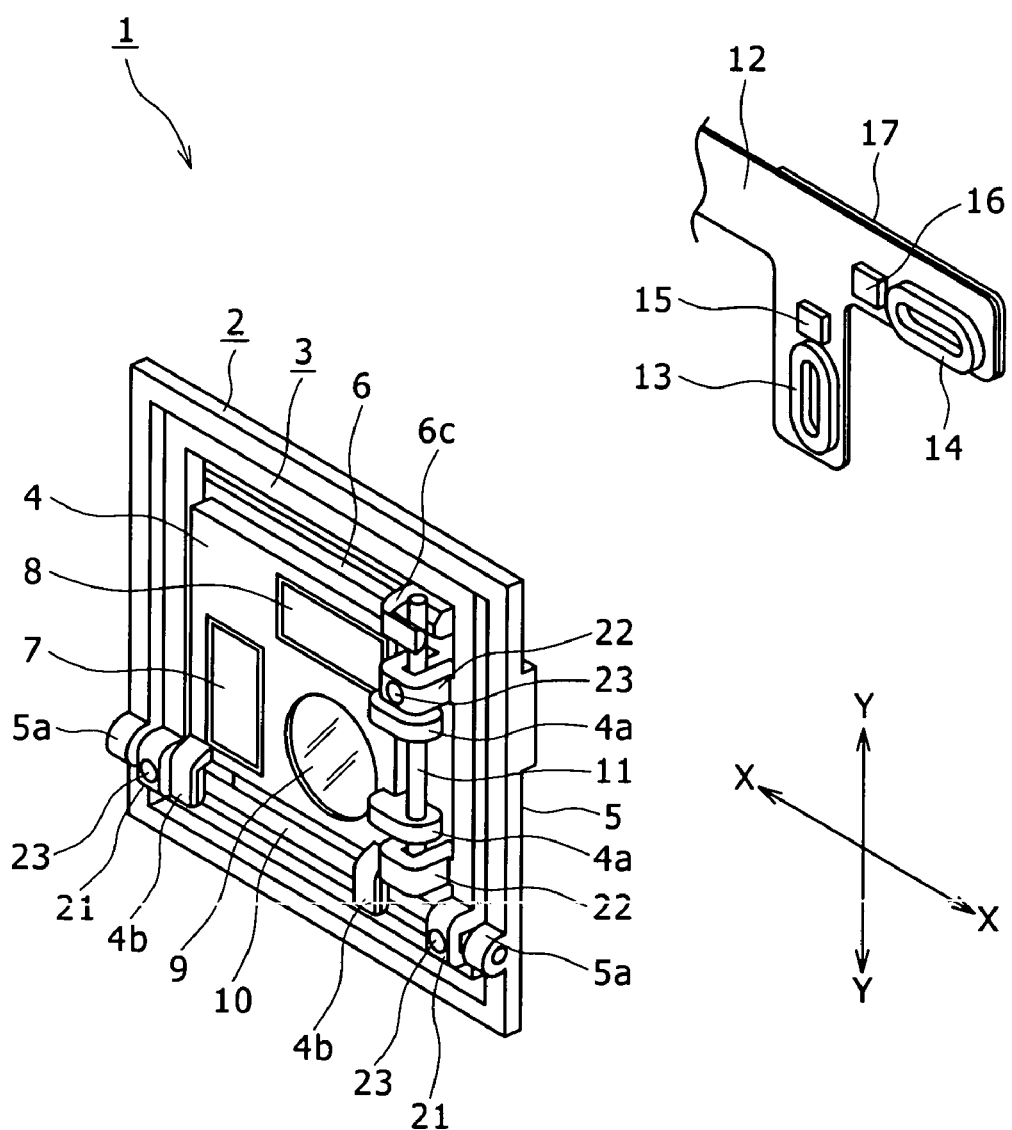
FIG. 8 is a perspective view showing the image shake correction apparatus of FIG. 7 with the flexible printed wiring board removed.

Further, a pair of channel-shaped bearing sections 21 open rearwardly as shown in FIGS. 7 and 8 may be provided in place of the round bearing sections 3c at positions of the intermediate member 3 rather near to the lower end, and a pair of channel-shaped bearing sections 22 open rearwardly may be provided in place of the bearing section 3a and the channel-shaped bearing section 3b of the intermediate member 3.

Figure 9:
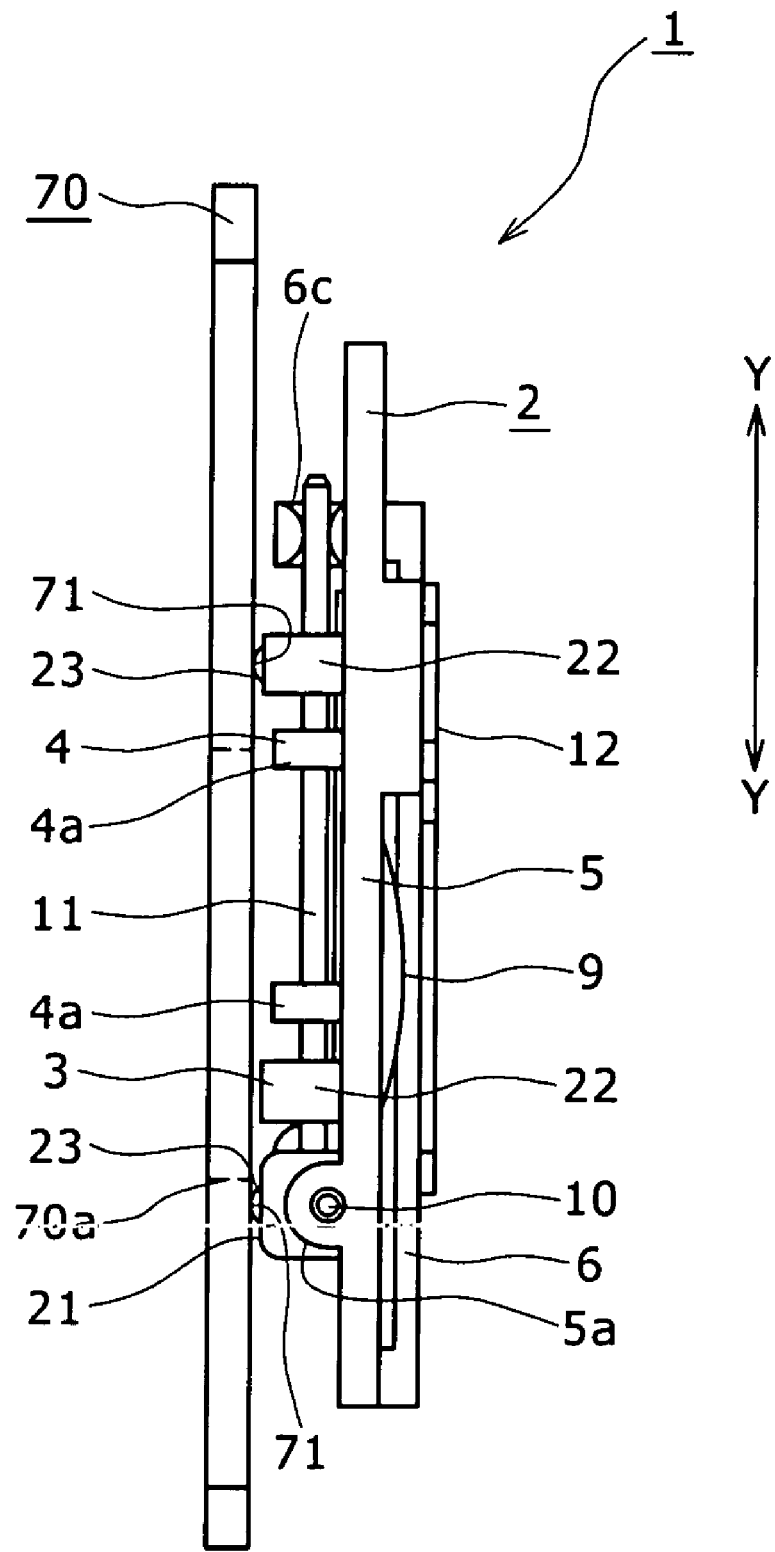
FIG. 9 is an enlarged side elevational view showing the image shake correction apparatus which uses a bearing section having a further changed shape together with a holding tube.

In this instance, it is preferable to provide different portions of a holding tube 70, which is provided as an outer housing of a lens barrel, as receiving portions 71 and provide position restraining projections 23 on the channel-shaped bearing sections 21 of the intermediate member 3 and a front face of one of the bearing sections 22 which is positioned on the upper side for contacting with the receiving portions 71 as shown in FIG. 9. The position restraining projections 23 have an outer face formed as a moderately curved face. A perforation 70a for passing light therethrough to the lens 9 is formed in the holding tube 70.

Where the different portions of the holding tube 70 are provided as the receiving portions 71 and the position restraining projections 23 are provided on the channel-shaped bearing sections 21 and 22 of the intermediate member 3 in this manner, play of the intermediate member 3 in the direction of the optical axis can be prevented without relying upon the first guide shaft 10 and the second guide shaft 11. Even if the channel-shaped bearing sections 21 and 22 are provided to form a configuration wherein the intermediate member 3 can move forwardly with respect to the fixed member 2, the position restraining projections 23 are contacted with the receiving portions 71, and consequently, play of the intermediate member 3 in the direction of the optical axis with respect to the fixed member 2 can be prevented without relying upon the first guide shaft 10 and the second guide shaft 11.

Second Embodiment

Figure 10:
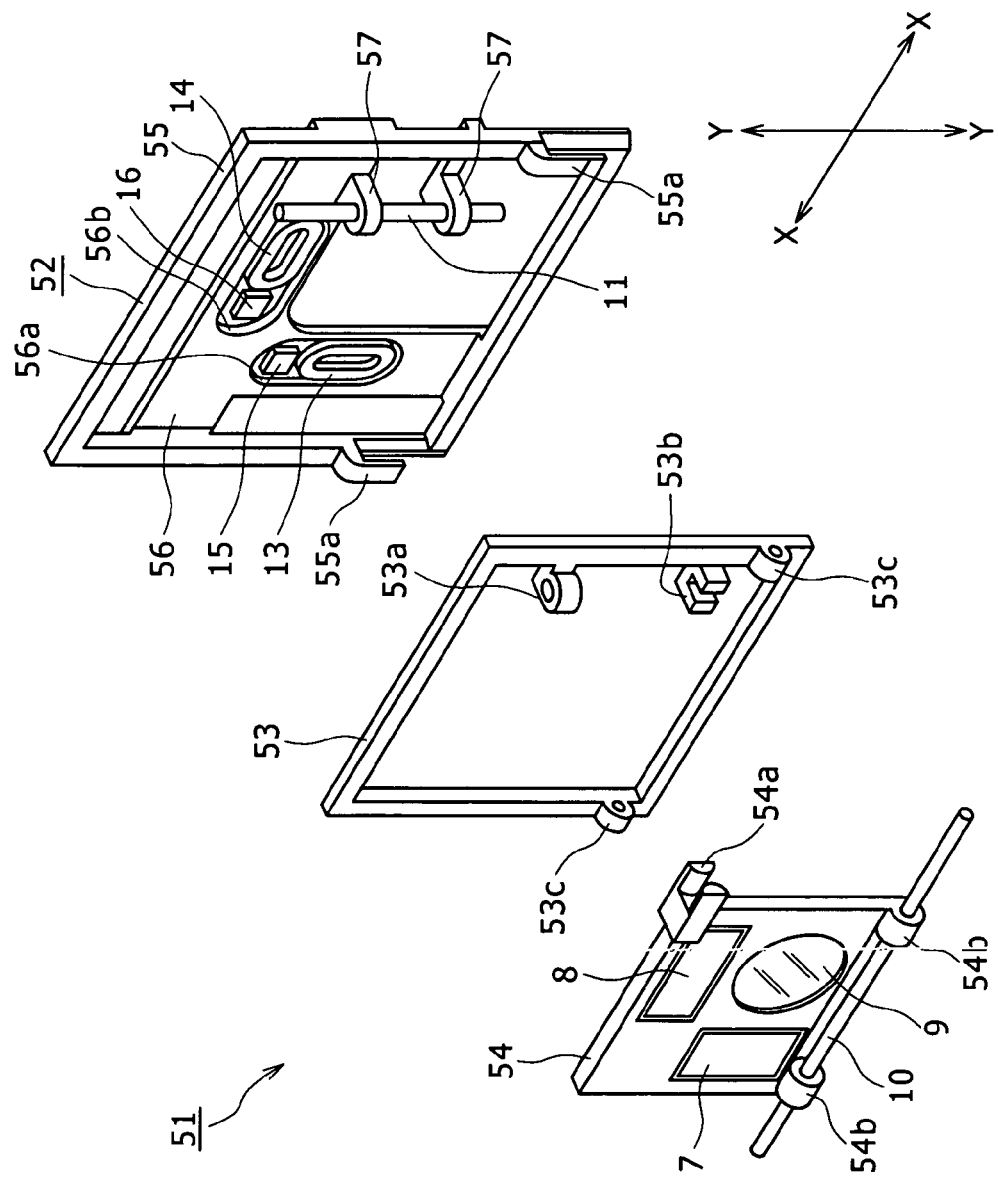
FIG. 10 is an exploded perspective view showing an image shake correction apparatus according to a second embodiment of the present invention.
Figure 11:
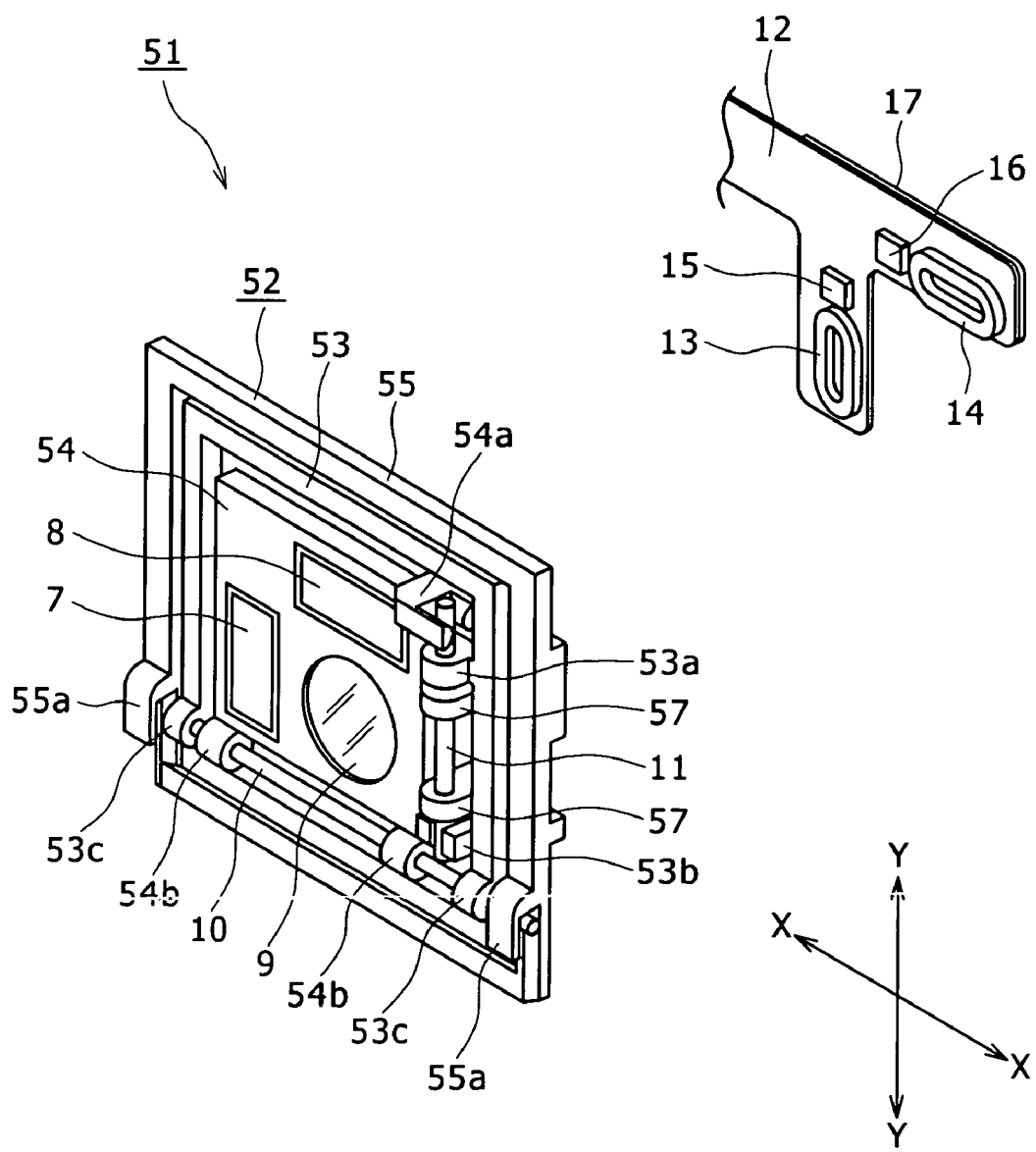
FIG. 11 is a perspective view of the image shake correction apparatus of FIG. 10.
Figure 12:
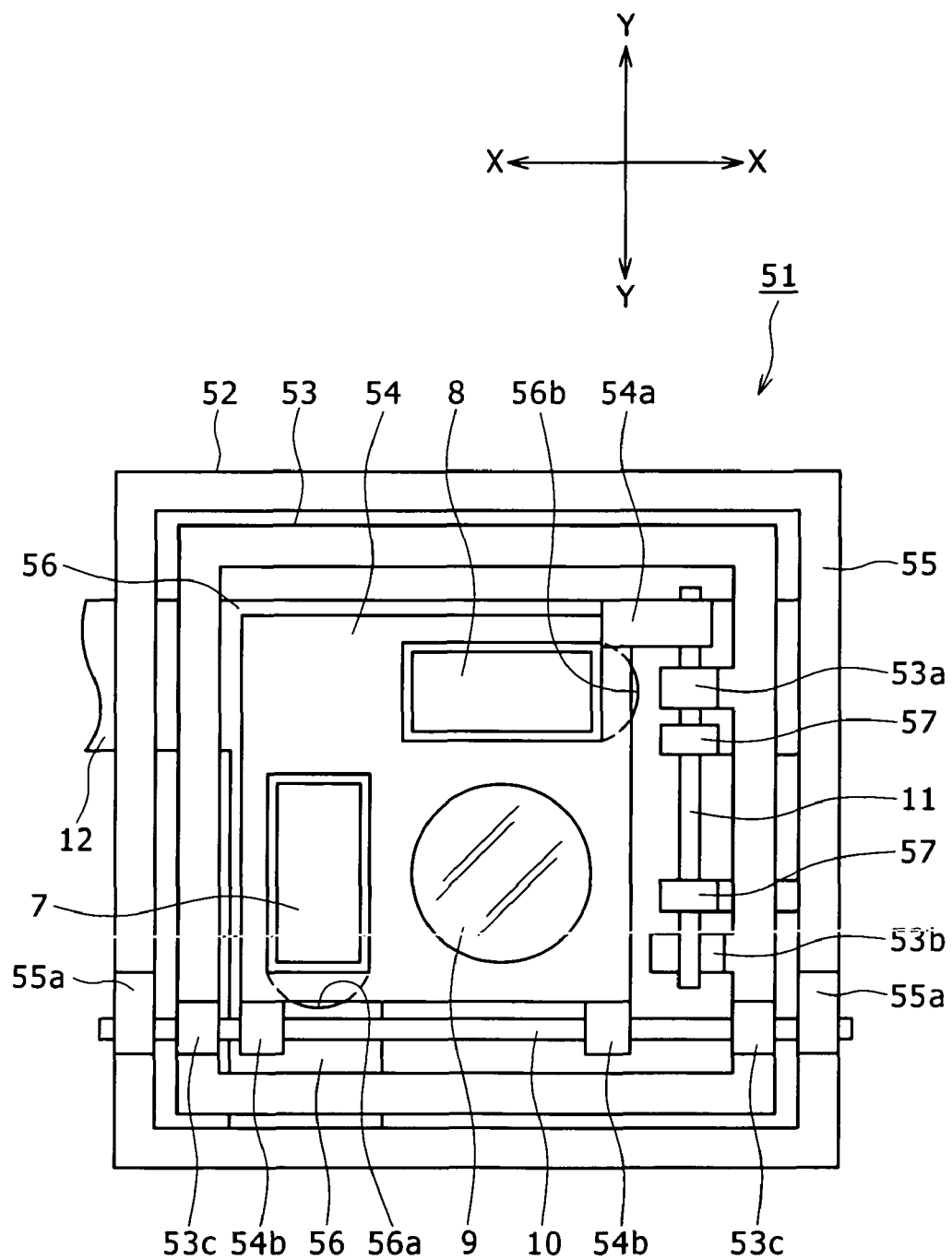
FIG. 12 is an enlarged front elevational view of the image shake correction apparatus of FIG. 10.

In the following, the image pickup correction apparatus according to a second embodiment of the present invention is described with reference to FIGS. 10 to 12.

The image shake correction apparatus 51 includes a fixed member 52, an intermediate member 53 and a movable member 54.

The fixed member 52 includes a framework-like portion 55 formed like a rectangular framework and an attaching face portion 56 provided on the inner side of the framework-like portion 55. The fixed member 52 is secured, for example, to a holding tube not shown provided as an external housing for a lens barrel.

A pair of fixing pieces 57 are provided in an upwardly and downwardly spaced relationship from each other at positions of the fixed member 52 rather near to a left end. A circular bearing hole is formed upwardly and downwardly through each of the fixing pieces 57. A pair of channel-shaped bearing sections 55a are provided in a leftwardly and rightwardly spaced relationship from each other at positions of the framework-like portion 55 of the fixed member 52 rather near to a lower end such that they are open downwardly.

The attaching face portion 56 of the fixed member is provided such that it connects the rear face of the framework-like portion 55, and a vertically elongated first disposition hole 56a and a horizontally elongated second disposition hole 56b are formed on the attaching face portion 56.

The intermediate member 53 is formed as a rectangular framework one size smaller than the framework-like portion 55 of the fixed member 52.

A bearing portion 53a is provided at a position of a left end portion of the intermediate member 53 rather near to an upper end such that it projects forwardly. A bearing hole elongated in the forward and backward direction is formed upwardly and downwardly through the bearing portion 53a. A channel-shaped bearing section 53b is provided at a position of a left end portion of the intermediate member 53 rather near to a lower end and projects forwardly such that it is open forwardly. A pair of round bearing sections 53c are provided in a leftwardly and rightwardly spaced relationship from each other at positions of the intermediate member 53 rather near to a lower end and project forwardly. A circular bearing hole is formed leftwardly and rightwardly through each of the round bearing sections 53c.

The movable member 54 is formed as, a rectangular plate and has an outer shape smaller than the inner shape of the intermediate member 53.

A vertically elongated first driving magnet 7 and a horizontally elongated second driving magnet 8 are attached in an embedded state to the movable member 54. A lens 9 is held on the movable member 54 and functions as a lens for correction.

It is to be noted that the lens 9 may be replaced by an image pickup device such as a CCD device or a CMOS device.

A channel-shaped bearing section 54a is provided at an upper end portion of a left end portion of the movable member 54 such that it projects leftwardly and is open leftwardly. A pair of round bearing portions 54b are provided in a leftwardly and rightwardly spaced relationship from each other at a lower end portion of the movable member 54.

The fixed member 52 is supported at the channel-shaped bearing sections 55a thereof for sliding movement on a first guide shaft 10 which extends in the leftward and rightward direction. A second guide shaft 11 is secured to the fixing pieces 57 of the fixed member 52 such that it projects upwardly and downwardly. The second guide shaft 11 projects at the opposite upper and lower end portions thereof upwardly and downwardly from the fixing pieces 57.

A flexible printed wiring board 12 is attached to a rear face of the attaching face portion 56 of the fixed member 52, and a vertically elongated first driving coil 13 and a horizontally elongated second driving coil 14 are attached to the front face of the flexible printed wiring board 12. A first detection element 15 and a second detection element 16 are attached to positions of the front face of the flexible printed wiring board 12 which are adjacent the first driving coil 13 and the second driving coil 14, respectively. For example, a Hall device is used for the first detection element 15 and the second detection element 16. A reinforcing plate 17 is attached to the rear face of the flexible printed wiring board 12.

In a state wherein the flexible printed wiring board 12 is attached to the rear face of the attaching face portion 56, the first driving coil 13 and the first detection element 15 are inserted and disposed in the first disposition hole 56a and the second driving coil 14 and the second detection element 16 are inserted and disposed in the second disposition hole 56b.

The intermediate member 53 is disposed on the inner periphery side of the framework-like portion 5 of the fixed member 2 with the round bearing sections 53c thereof supported for sliding movement on the first guide shaft 10 and with the bearing section 53a and the channel-shaped bearing section 53b thereof supported for sliding movement on the second guide shaft 11. Accordingly, the intermediate member 53 is movable in the first direction, that is, in the leftward and rightward direction, through the first guide shaft 10 on the inner periphery side of the framework-like portion 5 with respect to the fixed member 2.

The first guide shaft 10 is secured to the round bearing portions 54b of the movable member 54. The first guide shaft 10 projects at the opposite left and right end portions thereof leftwardly and downwardly from the round bearing portions 54b. The movable member 54 is disposed on the inner periphery side of the intermediate member 53.

In a state wherein the movable member 54 is disposed on the inner periphery side of the intermediate member 53, the first driving magnet 7 is positioned in an opposing relationship to and forwardly of the first driving coil 13 and the first detection element 15, and the second driving magnet 8 is positioned in an opposing relationship to and forwardly of the second driving coil 14 and the second detection element 16.

Since the movable member 54 is supported at the first guide shaft 10 thereof on the round bearing sections 53c, movement thereof in the second direction with respect to the intermediate member 53 is restrained. However, upon movement of the intermediate member 53 in the second direction with respect to the fixed member 52, the movable member 54 is moved integrally with the intermediate member 53 in the second direction.

Since the first guide shaft 10 secured to the round bearing sections 54a of the movable member 54 are slidably moved along the channel-shaped bearing section 55a of the fixed member 52 and the round bearing sections 53c of the intermediate member 53, the movable member 54 can move in the first direction with respect to the fixed member 52 and the intermediate member 53.

In the image shake correction apparatus 51 having such a configuration as described above, if current is supplied to the first driving coil 13, then leftward or rightward thrust is applied to the movable member 54 in response to the direction of the supplied current in a relation to the first driving magnet 7. Consequently, the movable member 54 is moved in the first direction with respect to the fixed member 52. On the other hand, if current is supplied to the second driving coil 14, then upward or downward thrust is applied to the movable member 54 in response to the direction of the supplied current in a relation to the second driving magnet 8. Consequently, the intermediate member 53 and the movable member 54 are moved integrally with each other in the second direction with respect to the fixed member 52.

As the movable member 54 which holds the lens 9 or the image pickup apparatus is moved in the first direction and the second direction as described above, image shake is corrected. At this time, the position of the movable member 54 with respect to the fixed member 52 is detected at any time by the first detection element 15 and the second detection element 16, and appropriate operation of the movable member 54 is achieved.

It is to be noted that, while, in the example described above, the channel-shaped bearing sections 55a are provided on the fixed member 52, the channel-shaped bearing section 52b is provided on the intermediate member 53 and the second channel-shaped bearing sections 54b are provided on the movable member 54, it is possible to replace each of the channel-shaped bearing sections 55a, 53b and 54b with a bearing section having an upwardly and downwardly, leftwardly and rightwardly or forwardly and backwardly elongated hole.

Further, while, in the example described above, the bearing section 53a having the bearing hole elongated forwardly and backwardly is provided on the intermediate member 53, also it is possible to replace the bearing section 53a with a channel-shaped bearing section which is open forwardly or rearwardly.

It is to be noted that the bearing section 53a is shaped so as to have not a circular bearing hole but a bearing hole elongated forwardly and backwardly. Where the bearing section 53a has the bearing hole elongated forwardly and backwardly in this manner, a good sliding property of the second guide shaft 11 with respect to the channel-shaped bearing sections 54a and 53b can be assured, and a smooth moving operation of the movable member 54 in the second direction can be assured.

As described above, in the image shake correction apparatus 51, the movable member 54 is moved in the first direction with respect to the fixed member 52 and. the intermediate member 53 and the movable member 54 are moved in the second direction with respect to the fixed member 52 to correct image shake. Therefore, the structure is simple, and simplification in mechanism and reduction in production cost can be anticipated.

Furthermore, in the image shake correction apparatus 51, since the intermediate member 53 and the movable member 54 are supported on the first guide shaft 10 and the second guide shaft 11 both supported on the fixed member 52, the accuracy in position of the movable member 54 in the direction of the optical axis and the accuracy in gradient of the movable member 54 with respect to the optical axis depend upon the accuracy in position of the first guide shaft 10 and the second guide shaft 11 but do not rely upon the accuracy in position and the accuracy in gradient of the intermediate member 53 with respect to the fixed member 52. Accordingly, since the accuracy in position of the lens 9 or the image pickup apparatus held on the movable member 54 does not rely upon the accuracy in position and the accuracy in gradient of the intermediate member 53, improvement in accuracy of the operation position in shake correction can be anticipated.

As described above, in the image shake correction apparatus 1 and 51, the second guide shaft 11 is provided which restrains movement of the movable member 4 in the first direction with respect to the intermediate member 3 or of the intermediate member 53 in the first direction with respect to the fixed member 52 and extends in the second direction. Further, in the image shake correction apparatus 1 and 51, the movable member 4 or 54 is supported on the first guide shaft 10 extending in the first direction and the second guide shaft 11 extending in the second direction.

Accordingly, upon movement of the movable member 4 or 54 in the first direction and the second direction, rotation of the movable member 4 or 54 in a plane perpendicular to the direction of the optical axis is prevented and smooth movement in the first direction and the second direction can be assured.

Further, since the intermediate member 3 or 53 is disposed on the inner periphery side of the framework-like portion 5 or 55 of the fixed member 2 or 52, reduction in thickness of the image shake correction apparatus 1 and 51 can be anticipated.

Furthermore, since the movable member 4 or 54 is disposed on the inner periphery side of the intermediate member 3 or 53, further reduction in thickness of the image shake correction apparatus 1 and 51 can be achieved.

In addition, where the direction of movement of the movable member 4 or 54 with respect to the fixed member 2 or 52 is set to the direction of the gravity, the holding force corresponding to the gravity is required only for the movable member 4 or 54 which does not include the intermediate member 3 or 53. Consequently, the power consumption can be reduced and improvement of the performance for shake correction can be anticipated as much.

It is to be noted that, while, in the foregoing description, the first direction is the leftward and rightward direction and the second direction is the upward and downward direction, the first direction and the second direction are not limited to the specific directions but may be any directions only if they are perpendicular to the direction of the optical axis and perpendicular to each other.

[Image Pickup Apparatus]

Figure 13:
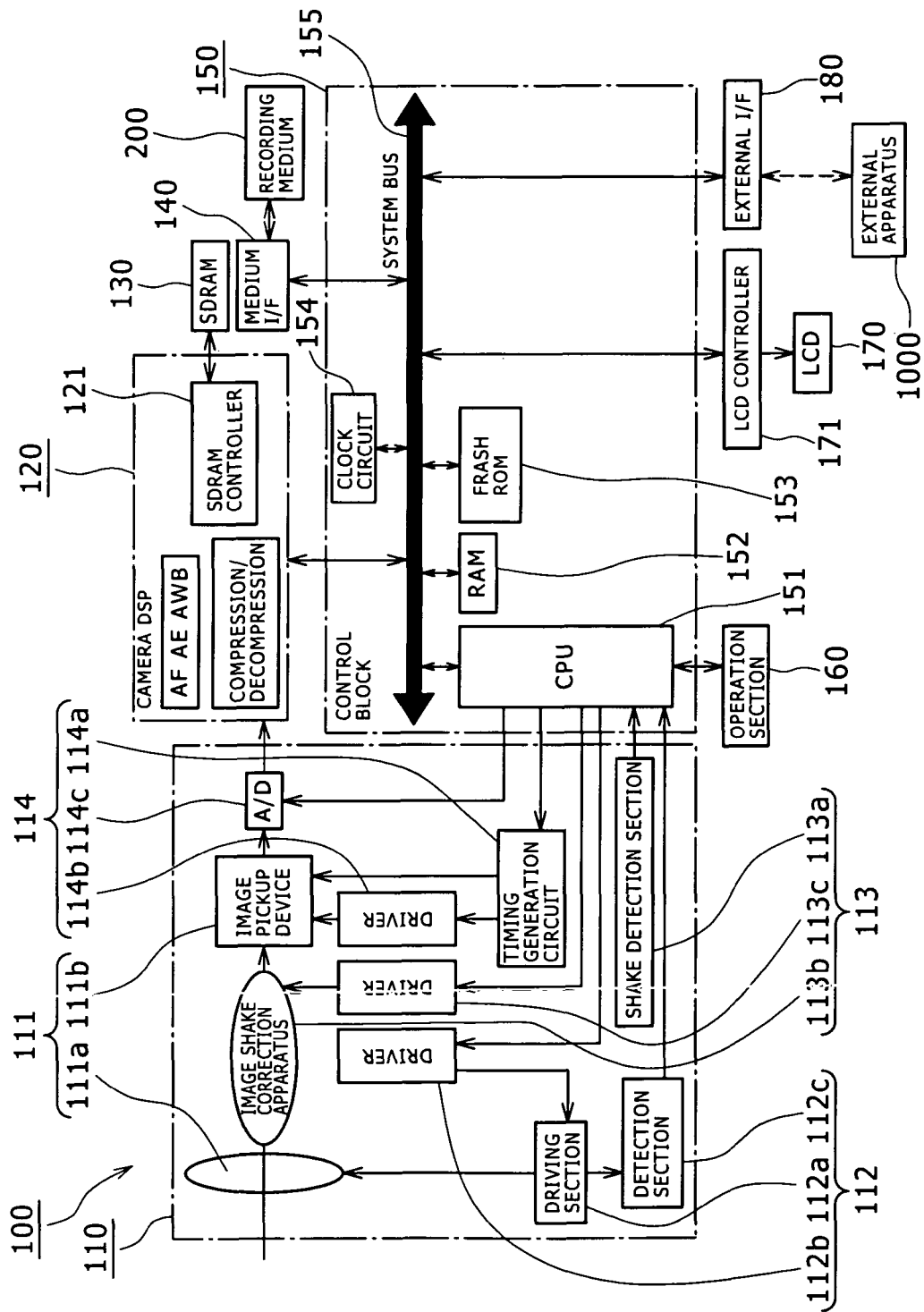
FIG. 13 is a block diagram showing an example of an image pickup apparatus.

Now, an example of an image pickup apparatus is described with reference to FIG. 13.

The image pickup apparatus 100 includes a camera block 110, a camera DSP (Digital Signal Processor) 120, an SDRAM (Synchronous Dynamic Random Access Memory) 130, a medium interface 140, a control block 150, an operation section 160, an LCD (Liquid Crystal Display) unit 170, and an external interface 180. A recording medium 200 can be removably loaded into the image pickup apparatus 100.

For the recording medium 200, various recording media can be used such as a memory card in which a semiconductor memory is used, a disk type recording medium such as a recordable DVD (Digital Versatile Disk) or a recordable CD (Compact Disc) and so forth.

The camera block 110 includes an image pickup section 111, a lens driving system 112, a camera shake correction system 113 and an image extraction section 114.

The image pickup section 111 has an image pickup lens 111a for obtaining an optical image and an image pickup device 111b for converting the obtained optical image into an electric signal. For the image pickup device 111b, for example, such a CCD image pickup device or a CMOS image pickup device as described hereinabove can be used.

The lens driving system 112 has a function of driving a movable lens in the image pickup lens 111a to carry out zooming and focusing. To this end, the lens driving system 112 has a driving section 112a such as a stepping motor for driving the movable lens, a driver 112b for signaling a driving signal to the driving section 112a and a detection section 112c for feeding back operation of the driving section 112a.

The camera shake correction system 113 detects image shake of the image pickup apparatus 100. To this end, the camera shake correction system 113 includes a shake detection section 113a such as a gyro sensor, and a driver 113c for operating an image shake correction apparatus 113b based on a result of the detection of the shake detection section 113a. The image shake correction apparatus 113b corresponds to the image shake correction apparatus 1 or 51 described hereinabove.

It is to be noted that, while the image shake correction apparatus 113b has the lens 9 which is moved in two directions perpendicular to the direction of the optical axis as described hereinabove, the image pickup device 111b such as a CCD image pickup device or a CMOS image pickup device may be used as a component of the camera shake correction system 113 in place of the lens 9.

The image extraction section 114 has a timing generation circuit 114a for generating a driving timing of the image pickup device 111b under the control of the control block 150, a driver 114b for driving the image pickup device 111b based on the timing generated by the timing generation circuit 114a, and an A/D conversion circuit 114c for converting an analog signal taken out from the image pickup device 111b into a digital signal.

The A/D conversion circuit 114c carries out a CDS (Correlated Double Sampling) process for image information in the form of an electric signal inputted thereto to assure a good S/N ratio and carries out an AGC (Automatic Gain Control) process to control the gain. Further, the A/D conversion circuit 114c carries out A/D (Analog/Digital) conversion to generate image data as a digital signal and so forth.

The camera DSP 120 carries out signal processing such as AF (Auto Focus), AE (Auto Exposure) and AWB (Auto White Balance) for the image data inputted thereto from the A/D conversion circuit 114c. The image data for which the signal processing such as AF, AE and AWB has been carried out are compressed in accordance with a predetermined method and outputted through the control block 150 to and recorded on the recording medium 200.

An SDRAM controller 121 is provided in the camera DSP 120, and reading out and writing of data are carried out at a high speed from and into the SDRAM 130 in accordance with an instruction of the SDRAM controller 121.

The control block 150 is a microcomputer which includes a CPU (Central Processing Unit) 151, a RAM (Random Access Memory) 152, a flash ROM (Read Only Memory) 153, a clock circuit 154 and so forth connected to each other through a system bus 155. The control block 150 has a function of controlling the components of the image pickup apparatus 100.

The CPU 151 signals an instruction signal to the drivers 112b and 113c and to the driver 114b through the timing generation circuit 114a to cause them to operate.

The RAM 152 is used principally as a working area for temporarily storing an intermediate result of processing.

The flash ROM 153 stores various programs to be executed by the CPU 151, data necessary for processing and so forth.

The clock circuit 154 outputs the date at present, the day of the week at present, the time at present, the date and time of image pickup and so forth.

The operation section 160 is a touch panel, control keys and so forth provided on an outer housing of the image pickup apparatus 100. If an operation is carried out for the operation section 160, then a signal corresponding to the operation is inputted to the CPU 151, and the CPU 151 signals various instruction signals based on the signal inputted thereto.

The LCD unit 170 is controlled by an LCD controller 171 connected to the system bus 155. The LCD unit 170 displays various kinds of information such as image data based on the driving signal from the LCD controller 171.

The external interface 180 is connected to the system bus 155. The external interface 180 is a connection section for connecting an external apparatus 1000 such as a personal computer to the image pickup apparatus 100. Where an external apparatus is connected to the image pickup apparatus 100 through the external interface 180, it is possible to receive image data from the external apparatus and record the image data on the recording medium 200 or output image data recorded in the recording medium 200 to the external apparatus. It is to be noted that the recording medium 200 is connected to the control block 150 through the medium interface 140 connected to the system bus 155.

Further, where an external apparatus such as a communication module is connected to the image pickup apparatus 100 through the external interface 180, it is possible, for example, to establish a connection to a network such as the Internet to acquire various image data or other information and record the acquired data or information on the recording medium 200 or transmit data recorded on the recording medium 200 to the opposite party through the network.

It is to be noted that it is possible to provide the external interface 180 as a wire interface complying with the IEEE (Institute of Electrical and Electronics Engineers) 1394, USB (Universal Serial Bus) or the like or as a wireless interface for optical or radio wave communication.

Image data recorded on the recording medium 200 are read out from the recording medium 200 in response to an operation signal corresponding to an operation for the operation section 160 carried out by the user and are signaled to the camera DSP 120 through the medium interface 140.

The camera DSP 120 carries out a data decompression process for the image data, which are in a compressed form, read out from the recording medium 200 and inputted to the camera DSP 120 and signals image data obtained by the decompression process to the LCD controller 171 through the system bus 155. The LCD controller 171 signals an image signal based on the image data inputted thereto to the LCD unit 170 so that an image based on the image signal is displayed on the LCD unit 170.

The image pickup apparatus 100 includes the image shake correction apparatus 1 or 51 (113b) having such a configuration as described above. Accordingly, in the image pickup apparatus 100, upon movement of the movable member 4 or 54 in the first direction and the second direction, rotation of the movable member 4 or 54 in a plane perpendicular to the direction of the optical axis is prevented and smooth movement in the first direction and the second direction can be assured.

The particular shapes and structures of the components disclosed in the foregoing description indicate mere examples of embodiment in carrying out the present invention, and the technical scope of the present invention shall not be interpreted restrictively by them.

It should be understood by those skilled in the art that various modifications, combinations, sub-combinations and alterations may occur depending on design requirements and other factors insofar as they are within the scope of the appended claims or the equivalents thereof.

What is claimed is:

1. An image shake correction apparatus, comprising:
a fixed member fixed in three directions including a direction of an optical axis, a first direction perpendicular to the direction of the optical axis, and a second direction perpendicular to both of the direction of the optical axis and the first direction;
a first guide shaft extending in the first direction, said first guide shaft being fixedly attached to said fixed member;
a second guide shaft extending in the second direction, said fixed member being supported by said second guide shaft;
an intermediate member supported on said first guide shaft and said second guide shaft for movement in one of the first and second directions but against movement in the other of the first and second directions with respect to said fixed member; and
a movable member having a lens or an image pickup device held thereon and having said second guide shaft fixedly attached thereto and having a portion which directly contacts the first guide shaft such that said movable member is supported on said first and second guide shafts for movement in the first and second directions with respect to said fixed member and for movement in the other of the first and second directions but against movement in the one of the first and second directions with respect to said intermediate member,
said intermediate member and said movable member being moved integrally with each other in the one of the first and second directions with respect to said fixed member while said movable member is moved in the other of the first and second directions with respect to said fixed member to correct image shake.

2. The image shake correction apparatus according to claim 1, wherein
said fixed member has an outer peripheral portion formed in the form of a framework, and
said intermediate member is positioned on the inner periphery side of the outer peripheral portion of said fixed member.

3. The image shake correction apparatus according to claim 2, wherein
said intermediate member is formed in the form of a framework, and
said movable member is positioned on the inner periphery side of said intermediate member.

4. The image shake correction apparatus according to claim 1, wherein
said fixed member has a receiving portion, and
said intermediate member has a position restraining projection provided thereon and projecting in the direction of the optical axis so as to be capable of contacting with said receiving portion in the direction of the optical axis.

5. The image shake correction apparatus according to claim 1, wherein
the other of the first and second directions is the direction of the gravity.

6. An image shake correction apparatus, comprising:
a fixed member fixed in three directions including a direction of an optical axis, a first direction perpendicular to the direction of the optical axis, and a second direction perpendicular to both of the direction of the optical axis and the first direction;
a first guide shaft supported on said fixed member and extending in the first direction;
a second guide shaft supported on said fixed member and extending in the second direction;
an intermediate member supported on said first guide shaft and said second guide shaft for movement in one of the first and second directions but against movement in the other of the first and second directions with respect to said fixed member; and
a movable member having a lens or an image pickup device held thereon and supported on said first and second guide shafts for movement in the first and second directions with respect to said fixed member and for movement in the other of the first and second directions but against movement in the one of the first and second directions with respect to said intermediate member,
said intermediate member and said movable member being moved integrally with each other in the one of the first and second directions with respect to said fixed member while said movable member is moved in the other of the first and second directions with respect to said fixed member to correct image shake,
wherein said intermediate member has a position restraining projection provided thereon and projecting in the direction of the optical axis so as to be capable of contacting with a holding tube, which holds said fixed member thereon, in the direction of the optical axis.

7. An image pickup apparatus, comprising
an image shake correction apparatus for moving an lens or an image pickup device in a direction perpendicular to a direction of an optical axis to correct image shake,
said image shake correction apparatus including
a fixed member fixed in three directions including a direction of an optical axis, a first direction perpendicular to the direction of the optical axis, and a second direction perpendicular to both of the direction of the optical axis and the first direction,
a first guide shaft extending in the first direction, said first guide shaft being fixedly attached to said fixed member,
a second guide shaft extending in the second direction, said fixed member being supported by said second guide shaft,
an intermediate member supported on said first guide shaft and said second guide shaft for movement in one of the first and second directions but against movement in the other of the first and second directions with respect to said fixed member, and
a movable member having a lens or an image pickup device held thereon and having said second guide shaft fixedly attached thereto and having a portion which directly contacts the first guide shaft such that said movable member is supported on said first and second guide shafts for movement in the first and second directions with respect to said fixed member and for movement in the other of the first and second directions but against movement in the one of the first and second directions with respect to said intermediate member,
said intermediate member and said movable member being moved integrally with each other in the one of the first and second directions with respect to said fixed member while said movable member is moved in the other of the first and second directions with respect to said fixed member to correct image shake.

8. The image pickup apparatus according to claim 7, wherein
the other of the first and second directions is the direction of the gravity.

* * * * *